US012026471B2

(12) United States Patent
Tripathi et al.

(10) Patent No.: US 12,026,471 B2
(45) Date of Patent: Jul. 2, 2024

(54) AUTOMATED GENERATION OF CHATBOT

(71) Applicant: ACCENTURE GLOBAL SOLUTIONS LIMITED, Dublin (IE)

(72) Inventors: Anurag D. Tripathi, Gurugram (IN); Rinki Arya, Bangalore (IN); Jorjeta Jetcheva, San Jose, CA (US); Krishna Kummamuru, Bangalore (IN); Sonam Gupta, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 288 days.

(21) Appl. No.: 17/232,991

(22) Filed: Apr. 16, 2021

(65) Prior Publication Data

US 2022/0335223 A1 Oct. 20, 2022

(51) Int. Cl.
| | |
|---|---|
| G06F 40/35 | (2020.01) |
| G06F 40/242 | (2020.01) |
| G06F 40/279 | (2020.01) |
| G06F 40/40 | (2020.01) |
| G06N 20/00 | (2019.01) |
| H04L 51/02 | (2022.01) |

(52) U.S. Cl.
CPC ............ *G06F 40/35* (2020.01); *G06F 40/242* (2020.01); *G06F 40/279* (2020.01); *G06F 40/40* (2020.01); *G06N 20/00* (2019.01); *H04L 51/02* (2013.01)

(58) Field of Classification Search
CPC ...... G06F 40/35; G06F 40/242; G06F 40/279; G06F 40/40
See application file for complete search history.

(56) References Cited

U.S. PATENT DOCUMENTS

| | | | | |
|---|---|---|---|---|
| 9,070,366 | B1* | 6/2015 | Mathias | G10L 15/22 |
| 10,445,745 | B1* | 10/2019 | Chopra | G06F 16/3344 |
| 10,937,446 | B1* | 3/2021 | Wong | G06N 3/044 |
| 11,204,964 | B1* | 12/2021 | Coope | G06F 40/56 |
| 11,392,773 | B1* | 7/2022 | Gangadharaiah | G06F 40/242 |
| 11,545,157 | B2* | 1/2023 | Wang | G10L 17/04 |
| 2014/0136212 | A1* | 5/2014 | Kwon | G10L 15/22 |
| | | | | 704/275 |
| 2015/0006171 | A1* | 1/2015 | Westby | G06F 16/686 |
| | | | | 704/235 |

(Continued)

OTHER PUBLICATIONS

Neil Mallinar et al., "Bootstrapping Conversational Agents with Weak Supervision", The Thirty-First AAAI Conference on Innovative Applications of Artificial Intelligence (IAAI-19), 2019, pp. 9528-9533.

(Continued)

*Primary Examiner* — Anne L Thomas-Homescu
(74) *Attorney, Agent, or Firm* — Mannava & Kang, P.C.

(57) ABSTRACT

The present disclosure relates to automated chatbot generation for different domains from available human-to-human chat logs. The systems and methods may be configured to cluster user utterances as well as agent utterances from the human chat logs. A data miner mines intents and entities from the user utterance clustering and mines actions from agent utterances. The intents, entities and actions mined are used to generate a set of stories or flows which are further used by a machine learning engine to train the chatbot. The stories or flows are also generated automatically by mapping the intents with the actions.

20 Claims, 13 Drawing Sheets

(56) References Cited

U.S. PATENT DOCUMENTS

| | | | | |
|---|---|---|---|---|
| 2019/0012371 | A1* | 1/2019 | Campbell | G06F 16/3329 |
| 2019/0198013 | A1* | 6/2019 | Hirzel | G10L 15/187 |
| 2020/0387550 | A1* | 12/2020 | Cappetta | H04L 51/02 |
| 2021/0082400 | A1* | 3/2021 | Vishnoi | G06F 40/284 |
| 2021/0303798 | A1* | 9/2021 | Duong | H04L 51/02 |
| 2021/0304733 | A1* | 9/2021 | Jalaluddin | G06F 40/284 |
| 2021/0358483 | A1* | 11/2021 | Chao | G10L 17/00 |
| 2021/0390951 | A1* | 12/2021 | Gadde | G06F 40/30 |
| 2022/0108080 | A1* | 4/2022 | Munavalli | G06N 3/08 |
| 2022/0129556 | A1* | 4/2022 | Chen | G06F 21/74 |
| 2022/0237567 | A1* | 7/2022 | Tiwari | G06Q 10/1053 |
| 2022/0310083 | A1* | 9/2022 | Mohanty | G06N 5/02 |
| 2023/0092702 | A1* | 3/2023 | Mao | G06F 16/383 |
| | | | | 704/9 |

OTHER PUBLICATIONS

Maira Gatti de Bayser et al., "Learning Multi-Party Turn-Taking Models from Dialogue Logs", Jul. 3, 2019, 14 pages. <https://arxiv.org/pdf/1907.02090.pdf>.

* cited by examiner

INTENT : INTENT2
- IT IS WITH SUCH GREAT DISAPPOINTMENT THAT I AM WRITING THIS. I AM SO DEEPLY UPSET BY YOUR CUSTOMER SERVICE TEAM AND RESPONSE THAT I HAVE RECEIVED TO
- IT IS WITH SUCH GREAT DISAPPOINTMENT THAT I AM WRITING THIS. I AM SO DEEPLY UPSET BY YOUR CUSTOMER SERVICE TEAM AND RESPONSE THAT I HAVE RECEIVED TO
- IT IS WITH SUCH GREAT DISAPPOINTMENT THAT I AM WRITING THIS. I AM SO DEEPLY UPSET BY YOUR CUSTOMER SERVICE TEAM AND RESPONSE THAT I HAVE RECEIVED TO

INTENT : INTENT7
- GOOD EVENING, ID LIKE TO MAKE A COMPLAINT ABOUT THE HORRIBLE CUSTOMER SERVICE I HAVE RECEIVED TO FROM SOME OF YOUR ADVISORS WHICH HAS RESULTED IN

INTENT : INTENT9
- HI, MY NAME IS RAHUL DRAVID. MY REF NUMBER: 123456. AREA CODE 12. MY MOBILE [1234567890] (CARDINAL). I AM ASKING YOU TO REVIEW MY BILLS PLEASE WHICH I

INTENT : INTENT1
- EXTERNAL EMAIL * YOUR BILL IS READY TO VIEW BILL DATE: 12 MAY £35.00 DIRECT DEBIT DATE: 12TH JUNE VIEW THIS BILL YOUR LATEST VIRGIN MEDIA BILL

*FIG. 4C*

UTTER_ACTION6:
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."
-TEXT: "WELCOME BACK TO VIRGIN MEDIA'S TEXT MESSAGING SERVICE. WE'LL BE ON THE CASE AS SOON AS POSSIBLE. JUST A REMINDER THAT REPLIES FROM THIS SERVICE
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."

UTTER_ACTION9:
-TEXT: "I CAN CERTAINLY LOOK INTO THIS FOR YOU. FIRST, I'LL NEED YOU TO CONFIRM YOUR FULL NAME, YOUR MY VIRGIN MEDIA ACCOUNT NUMBER AND LASTLY ARE

UTTER_ACTION8:
-TEXT: "BEFORE WE GET STARTED, WE'LL NEED TO GO THROUGH A FEW SECURITY QUESTIONS. I AM GOING TO SEND YOU A SECURE WEB FORM FOR YOU TO ANSWER. PLEASE

UTTER_ACTION5:
-TEXT: "THANK YOU, THAT'S RIGHT. I CAN SEE THAT YOU HAD 3 MONTHS FREE SERVICE ON THE VIP DEAL AND THE VIP DEAL WOULD HAVE COSTED $ 79.00 FOR THE REST OF

UTTER_ACTION7:
-TEXT: "CERTAINLY, YOU CAN CONTACT US A MONTH BEFORE CONTRACT ENDS SO THAT YOU CAN CHANGE YOUR PACKAGE ACCORDINGLY. OUR CANCELLATION OR DOWNGRADE WILL

UTTER_ACTION3:
-TEXT: "HOLD ON WHILE I TRANSFER YOU TO AN AGENT. PLEASE BE AWARE THAT REPLIES FROM THIS SERVICE ARE NOT IMMEDIATE, ALLOWING YOU TO GET ON WITH YOUR
-TEXT: "HOLD ON WHILE I TRANSFER YOU TO AN AGENT. PLEASE BE AWARE THAT REPLIES FROM THIS SERVICE ARE NOT IMMEDIATE, ALLOWING YOU TO GET ON WITH YOUR

FIG. 4D

UTTER_ACTION6:
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."
-TEXT: "WELCOME BACK TO VIRGIN MEDIA'S TEXT MESSAGING SERVICE. WE'LL BE ON THE CASE AS SOON AS POSSIBLE. JUST A REMINDER THAT REPLIES FROM THIS SERVICE
-TEXT: "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE."

UTTER_ACTION9:
-TEXT: "I CAN CERTAINLY LOOK INTO THIS FOR YOU. FIRST, I'LL NEED YOU TO CONFIRM YOUR FULL NAME, YOUR MY VIRGIN MEDIA ACCOUNT NUMBER AND LASTLY ARE

UTTER_ACTION8:
-TEXT: "BEFORE WE GET STARTED, WE'LL NEED TO GO THROUGH A FEW SECURITY QUESTIONS. I AM GOING TO SEND YOU A SECURE WEB FORM FOR YOU TO ANSWER. PLEASE

UTTER_ACTION5:
-TEXT: "THANK YOU, THAT'S RIGHT. I CAN SEE THAT YOU HAD 3 MONTHS FREE SERVICE ON THE VIP DEAL AND THE VIP DEAL WOULD HAVE COSTED $ 79.00 FOR THE REST OF

UTTER_ACTION7:
-TEXT: "CERTAINLY, YOU CAN CONTACT US A MONTH BEFORE CONTRACT ENDS SO THAT YOU CAN CHANGE YOUR PACKAGE ACCORDINGLY. OUR CANCELLATION OR DOWNGRADE WILL

UTTER_ACTION3:
-TEXT: "HOLD ON WHILE I TRANSFER YOU TO AN AGENT. PLEASE BE AWARE THAT REPLIES FROM THIS SERVICE ARE NOT IMMEDIATE, ALLOWING YOU TO GET ON WITH YOUR
-TEXT: "HOLD ON WHILE I TRANSFER YOU TO AN AGENT. PLEASE BE AWARE THAT REPLIES FROM THIS SERVICE ARE NOT IMMEDIATE, ALLOWING YOU TO GET ON WITH YOUR

*FIG. 4E*

| | GENERATED_STORIES_09-09-2019_14-59-42.MD | HUMAN_CHAT_LOG_LAYER_RUN\...\HUMAN_CHAT_PROCESSOR.PY |
|---|---|---|
| 1 | ## 6 | |
| 2 | * INTENTSUB8_26 {"EMAIL": "VIRAT.KOHLI@GMAIL.COM"} | |
| 3 | - SLOT {"EMAIL": "VIRAT.KOHLI@GMAIL.COM"} | |
| 4 | -ACTION3 | |
| 5 | | |
| 6 | | |

FIG. 4F

UPDATING RASA TRACKER & STORY GENERATION

HANDLING CONVERSATION # 6

INITIAL TRACKER:

DIALOGUE WITH NAME '6' AND TURNS:
    ACTIONEXECUTED(ACTION: ACTION_LISTEN, POLICY: NONE, CONFIDENCE: NONE)

---

HANDLING MESSAGE: {'TEXT': "HI I NEED TO ASK YOU ABOUT EBILL WHICH I HAVEN'T RECEIVED. MY EMAIL ADDRESS IS: VIRAT.KOLHI@GMAIL.COM",'TYPE': 'CONSUMER'}

ENTITY: {'VIRAT.KOLHI@GMAIL.COM','EMAIL'}

ENTITY NAME: EMAIL

ENTITY VALUE: VIRAT.KOLHI@GMAIL.COM

UPDATED TRACKER:

DIALOGUE WITH NAME '6' AND TURNS:
    ACTIONEXECUTED(ACTION: ACTION_LISTEN, POLICY: NONE, CONFIDENCE: NONE)
    USERUTTERED(TEXT: HI I NEED TO ASK YOU ABOUT EBILL WHICH I HAVEN'T RECEIVED. MY EMAIL ADDRESS IS VIRAT.KOLHI@GMAIL.COM, INTENT: {'CONFIDENCE':1, 'NAME':INTENTSUB8_26'}, ENTITIES:[{'ENTITY':'EMAIL','VALUE':'VIRAT.KOLHI@GMAIL.COM'}])
    SLOTSET(KEY: EMAIL, VALUE: VIRAT.KOLHI@GMAIL.COM)

HANDLING MESSAGE: {'TEXT': "WELCOME BACK TO VIRGIN MEDIA'S TEXT MESSAGING SERVICE. WE ARE CURRENTLY BUSIER THAN NORMAL BUT WE'LL BE ON THE CASE AS SOON AS POSSIBLE.", 'TYPE':'AGENT'}

UPDATED TRACKER:

DIALOGUE WITH NAME '6' AND TRUNS:
    ACTIONEXECUTED(ACTION: ACTION_LISTEN, POLICY: NONE, CONFIDENCE: NONE)

USERUTTERED(TEXT: HI I NEED TO ASK YOU ABOUT EBILL WHICH I HAVEN'T RECEIVED. MY EMAIL ADDRESS IS VIRAT.KOLHI@GMAIL.COM, INTENT: {'CONFIDENCE':1, 'NAME':INTENTSUB8_26'}, ENTITIES:[{'ENTITY':'EMAIL','VALUE':'VIRAT.KOLHI@GMAIL.COM'}])

SLOTSET(KEY: EMAIL, VALUE: VIRAT.KOLHI@GMAIL.COM)

ACTIONEXECUTED(ACTION: ACTION3, POLICY: DEFAULT, CONFIDENCE: 1)

*FIG. 4G*

34
- ACTION3
* INTENTSUB8_2
* INTENTSUB8_2
* INTENT1 {"PERSON": "BILL", "CARDINAL": "1234567"}
  - SLOT {"PERSON": "BILL"}
* INTENT6
* INTENTSUB8_2

35
* INTENTSUB8_2
  - ACTIONSUB1_7
  - ACTION8
* INTENTSUB8_2
  - ACTION6
* INTENTSUB8_2
* INTENTSUB8_2 {"PERSON": "BILL"}
  - SLOT {"PERSON": "BILL"}

36
- ACTION0
* INTENTSUB8_2
* INTENTSUB8_2

FIG. 4H

AUTOMATED GENERATION OF CHATBOT

BACKGROUND

A chatbot is an on-line chat conversation via text or text-to-speech, in lieu of providing direct contact with a live human agent. Chatbots are used in dialog systems for various purposes including, for example, a customer service, a request routing, information gathering and other such activities. Some type of chatbots use extensive word-classification processes, natural language processors, and sophisticated artificial intelligence (AI). Other types of chatbots may only scan for general keywords and generate responses using common phrases obtained from an associated library or database. Most chatbots are accessed on-line via website popups or through virtual assistants. They may be classified into usage categories such as, for example, commerce (e-commerce via chat), education, entertainment, finance, health, news, productivity, and other such categories.

There are different ways in which a chatbot can simulate a conversation. These fall into two main strands, namely flow-based chat and intent-based chat. Intent is chatbot jargon for the motive of a given chatbot user. Intent relates to user requirements pertaining to an interaction. For example, when a user says, 'I need new shoes', the intent behind the message may be to browse an offer related to a footwear. An intent-based chatbot, therefore operates based on detection of the user intent. This indicates that instead of relying on a specific input, the chatbot is able to identify a context related to the input. Based on the context, a relevant and a tailored response may be generated. Intent-based chatbots work on a case-by-case basis. Each interaction may be performed differently compared to a previous interaction. Such chatbots need natural language processing (NLP). This is an element in Artificial Intelligence (AI) that allows machines to derive understanding from language as it is used in natural conversation. More specifically, an intent-based chatbot may look for key terms and 'entities' in a received message.

Different frameworks are available to create a chatbot and keep track of conversations through trackers such as RASA, Dialogflow and the like. In these frameworks, one must work with a subject matter expert to understand the domain. It may become difficult, even for the subject matter expert, to identify an intent to generate actions and create data manually to train a machine learning model. On the other hand, a chat log conversation user includes specific information or private information. Hence, an owner of the conversation logs may hesitate to share the chat log conversation with a third party. The third party may need to sign a service level agreement (SLA) to access those chat logs.

Chatbot systems typically require continuous tuning and testing to mimic human conversation. Many chatbots are unequipped to adequately converse or pass the industry standard Turing test. This is because of the complexity and human errors associated while creating a training data manually. Current techniques propose methods to train a classifier for intent mining from the conversational logs. The intents are used to create training examples to train the hot manually. This may be computationally complex, time consuming, expensive and may include maximum errors while creating training data. This may ultimately result in erroneous responses from the chatbots, thus reducing their reliability and usage, while involving greater complexity.

SUMMARY

An example embodiment of the present disclosure pertains to a system for generating an executable chatbot. The proposed system may include a processor. The processor includes a clusterer, a data miner, a story generator and a machine learning (ML) engine. The clusterer may receive, from a database, a set of human chat logs. The human chat logs may include a dialog of human-to-human conversations in a machine readable format between a first user and a second user. The clusterer may further be configured to extract a first and second set of attributes from the human chat logs. The first set of attributes may pertain to user utterances corresponding to the first user. The second set of attributes pertain to agent utterance corresponding to the second user. The user utterances and the agent utterances may be clustered by the clusterer based on the extracted first and the second set of attributes. In an example embodiment, the data miner may identify a plurality of intents based on the clustered user utterances and identify a plurality of actions based on the clustered agent utterances. Based on the identified plurality of intents and the plurality of actions, the story generator may generate a set of stories. The generated set of stories may correspond to mapping of a specific intent of the plurality of intents to a specific action of the plurality of actions. In another example embodiment, the ML engine may predict training data that may include the generated set of stories corresponding to each of the plurality of intents and plurality of actions to determine a trained model. The ML engine may further train, using the trained model, a chatbot to generate templates. The templates may be indicative of responses corresponding to a query generated by a user. The ML engine may further auto-generate the chatbot based on the trained model.

Another example embodiment of the present disclosure pertains to a method for generating a chatbot. The method can include the step of receiving by a processor from a database, a set of human chat logs. The human chat logs may include a dialog of human-to-human conversations in a machine readable format between a first user and a second user. An example method may further include the step for extracting by the processor, a first and second set of attributes from the human chat logs. The first set of attributes may pertain to user utterances corresponding to the first user. The second set of attributes may pertain to agent utterances corresponding to the second user. The method may further include the step of clustering by the processor, the user utterances and the agent utterances based on the extracted first and the second set of attributes. An example method of the present disclosure may include the step of identifying by the processor, a plurality of intents based on the clustered user utterances and identify a plurality of actions based on the clustered agent utterances. Another example method may include the step of generating by the processor, a set of stories based on the identified plurality of intents and the plurality of actions. The generated set of stories may correspond to mapping of a specific intent of the plurality of intents to a specific action of the plurality of actions. An example method can further include the step of predicting by the processor training data that may include the generated set of stories corresponding to each of the plurality of intents and plurality of actions to determine a trained model. The method may also include the step of training by the processor using the trained model, a chatbot to provide templates where the templates may be indicative of responses corresponding to a query generated by a user. The method may further include the step of auto-generating by the processor the chatbot based on the trained model.

The present disclosure further pertains to a non-transitory computer readable medium comprising machine executable instructions that are executable by a processor. Upon such execution of the machine executable instructions, the processor may receive from a database, a set of human chat logs. The human chat logs may include a dialog of human-to-human conversations in a machine readable format between a first user and a second user. The processor may further extract a first and second set of attributes from the human chat logs. The first set of attributes may pertain to user utterances corresponding to the first user, and where the second set of attributes pertain to agent utterance corresponding to the second user. The user utterances and the agent utterances may be clustered based on the extracted first and the second set of attributes. In an example embodiment, the processor may identify a plurality of intents based on the clustered user utterances and identify a plurality of actions based on the clustered agent utterances. Based on the identified plurality of intents and the plurality of actions the processor may generate a set of stories. The generated set of stories may correspond to mapping of a specific intent of the plurality of intents to a specific action of the plurality of actions. In another example embodiment, the processor may predict training data that may include the generated set of stories corresponding to each of the plurality of intents and plurality of actions to determine a trained model and may train, using the trained model, a chatbot to generate templates. The templates may be indicative of responses corresponding to a query generated by a user. The processor may be further auto-generate the chatbot based on the trained model.

BRIEF DESCRIPTION OF DRAWINGS

FIGS. 4C to 4H illustrate implementation of the proposed system during chatbot creation, according to example embodiments of the present disclosure.

DETAILED DESCRIPTION

Figure 1:
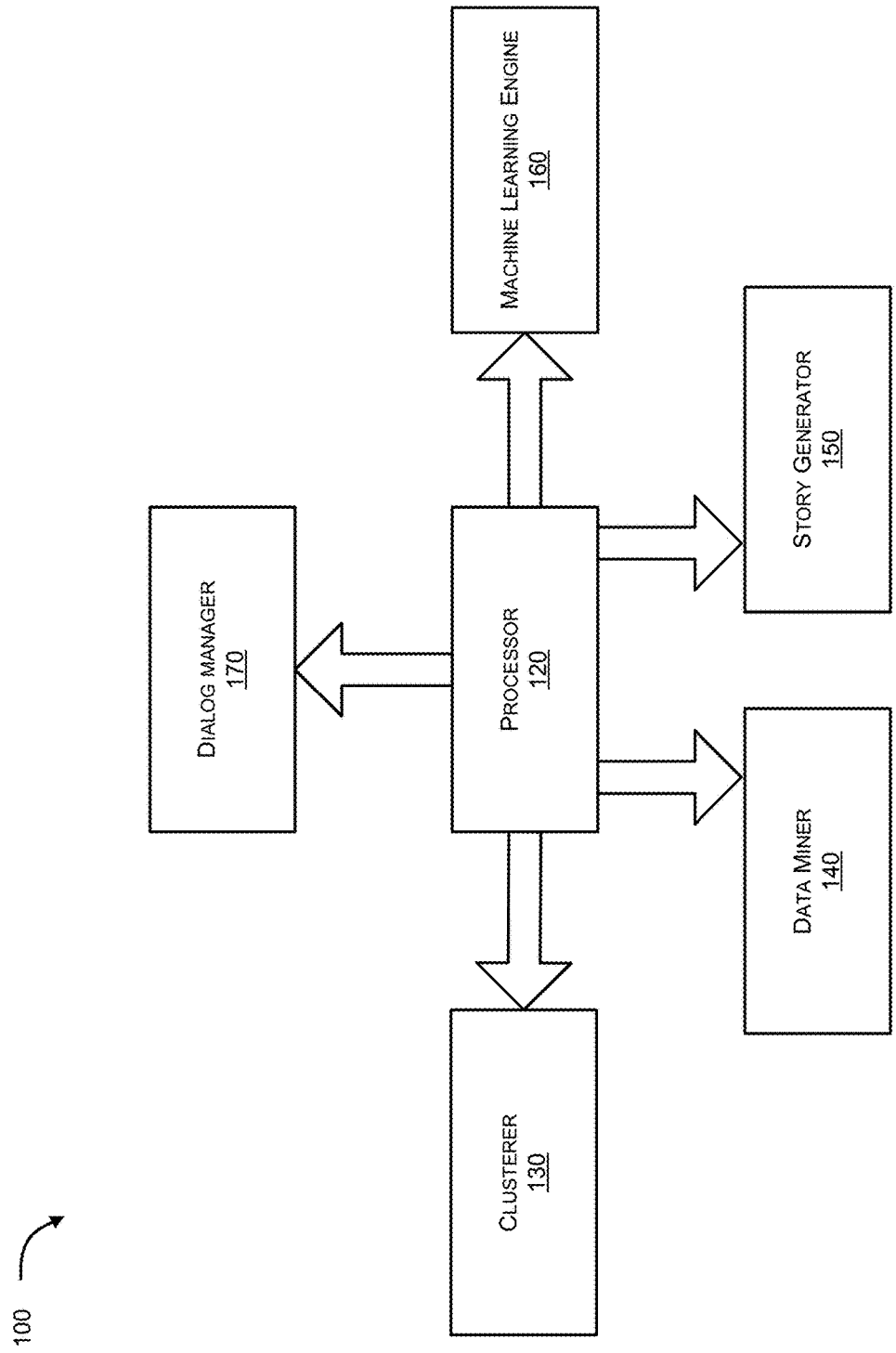
FIG. 1 illustrates a system for generating an executable chatbot, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited upon. The term "relevant" means closely connected or appropriate to what is being done or considered.

Overview

Various embodiments describe providing a solution for receiving a set of human chat logs and processing and analyzing the received set of human chat logs so as to generate and train a chatbot to provide responses to a user query.

An example embodiment of the present disclosure pertains to a system for generating an executable chatbot. The proposed system may include a processor. The processor may include a clusterer, a data miner, a story generator and an ML engine.

In an example embodiment, the clusterer may receive from a database, a set of human chat logs. The set of human chat logs may include a dialog of human-to-human conversations between a first user and a second user. The clusterer may then extract a first set of attributes and second set of attributes from the human chat logs. The first set of attributes may pertain to user utterances corresponding to the first user, and the second set of attributes may pertain to agent utterances corresponding to the second user. The user utterances and the agent utterances may be clustered by the clusterer based on the extracted first and the second set of attributes.

In an example embodiment, the data miner may identify a plurality of intents based on the clustered user utterances. The data miner may further identify a plurality of actions based on the clustered agent utterances.

Based on the identified plurality of intents and the plurality of actions the story generator may generate a set of stories (also interchangeably referred to as "flows" hereinafter) based on the identified plurality of intents and the plurality of actions. The generated set of stories may correspond to mapping of a specific intent of the plurality of intents to a specific action of the plurality of actions.

In another example embodiment, the ML engine may predict training data that may include the generated set of stories corresponding to each of the plurality of intents and plurality of actions to determine a trained model. The ML engine may further train, using the trained model, a chatbot to generate templates. The templates may be indicative of responses corresponding to a query generated by a user. Furthermore, the ML engine may auto-generate the chatbot based on the trained model. In an example embodiment the trained model may be SVM, LSTM and the like. and components of the model may be tokenizer, featurizer, entity extractor, classifier and the like.

The present disclosure describes a system for utilizing human chat logs to generate and train a chatbot. The system may cluster user utterances of a first user as well as agent utterances of the second user for intent mining and action mining respectively. The intents and actions may be then used to generate a set of stories. The system may then use at least one of the stories to generate and train the chatbot. System of the present disclosure gray select a ML model for generating a chatbot and training the created chatbot.

Exemplary embodiments of the present disclosure have been described in the context of generating an executable chatbot. The chatbot is not restricted only to set of human chat logs being associated with or generated by IT organizations. The chatbot may also be applied to a set of human chat logs handled by a majority of corporations for their health, financial, human resources, sales, marketing, manufacturing, or supply chain based conversations. It will be appreciated that embodiments and concepts described herein may be applied in other scenarios. For example, a set of human chat logs associated with or generated by academic institutions may have a requirement of interviewing faculty candidates. The requirement may be for a position, handling admission related queries of students, handling course related queries and handling examination related queries. Various other scenarios or application are possible.

FIG. 1 illustrates a system 100 for generating an executable chatbot, according to an example embodiment of the present disclosure. The system 100 may be implemented by way of a single device or a combination of multiple devices that are operatively connected or networked together. The system 100 may be implemented in hardware or a suitable combination of hardware and software.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 120 may include, for example, microprocessors, microcomputers, microcontrollers, digital signal processors, central processing units, state machines, logic circuits, and/or any devices that manipulate data or signals based on operational instructions. Among other capabilities, processor 120 may fetch and execute computer-readable instructions in a memory operationally coupled with system 100 for performing tasks such as data receiving, data processing input/output processing, attribute extraction, and/or any other functions. Any reference to a task in the present disclosure may refer to an operation being or that may be performed on data.

As illustrated, the system 100 may be a hardware device including a processor 120 executing machine readable program instructions to configure a clusterer 130 to receive a set of human chat logs from a database. The set of human chat logs may include human-to-human conversation between a first user and a second user. The clusterer 130 may then extract a first set of attributes and second set of attributes from the human chat logs. The first set of attributes may pertain to user utterances corresponding to the first user, and the second set of attributes may pertain to agent utterances corresponding to the second user. The human chat logs may include human-to-human conversations of a certain dialogue in a machine readable format. The clusterer 130 may be further configured to cluster the user utterances and the agent utterances based on the extracted first and the second set of attributes.

In an example embodiment, by way of an example and not as a limitation, the first user may be any customer, a consumer, a professional, a student, a friend, a client, a tourist and the like. In a way of example and not as a limitation, the first user may be a student who needs to enquire regarding various college courses or admission procedure. In another example, the first user may be a consumer who needs to enquire about services of an entity. In yet another example, the first user may be a friend having a conversation with another friend. The user utterances may be any dialog made by the first user.

In an example embodiment, the second user may be any customer care executive, a professional, an operator, an agent, a bank employee, any company executive, an acquaintance, a receptionist but not limited to the like. In an example, the second user may be an administrative manager providing details about courses offered by an institute or its admission procedure. In another example, the second user may be an agent providing details about services provided by an entity. In yet another example, the second user may be another friend in a friendly conversation with another friend. By way of an example and not as a limitation, the agent utterances may be any dialog made by the second user.

In an example embodiment, by way of an example and not as a limitation, the human-to-human conversation may include a friendly conversation, a business related conversation, any transaction related conversation and the like.

Execution of the machine readable program instructions by the processor may further cause a data miner 140 to identify a plurality of intents based on the clustered user utterances and identify a plurality of actions based on the clustered agent utterances. Processor 120 of the present disclosure may further cause a story generator 150 to generate a set of stories based on the identified plurality of intents and the plurality of actions. The generated set of stories may correspond to mapping of a specific intent of the plurality of intents to a specific action of the plurality of actions.

Execution of the machine readable program instructions by the processor may further cause an ML engine 160 to predict, training data that may include the generated set of stories corresponding to each of the plurality of intents and plurality of actions to determine a trained model. The ML engine 160 may further train, using the trained model, a chatbot to generate templates indicative of responses corresponding to a query generated by a user. Furthermore, the ML engine 160 may auto-generate the chatbot based on the trained model. The ML engine 160 may include multiple ML models, and various sets of instructions that can be executed to select an optimal ML model for the human chat logs.

In an example embodiment, the processor 120 may include a clusterer 130, a data miner 140, a story generator 150 and an ML engine 160. The set of human chat logs (also referred to as human chat logs hereinafter) may be obtained from a database. The database may be a central repository and may correspond to storing of human-to-human chat transcripts. Each transcript may be a complete conversation between at least a first user and at least a second user.

The stored human chat logs may be consumed by available intelligent units of the proposed system 100 for further pre-processing. Further, the human chat logs stored in the database may include at least one of user utterances and agent utterances.

The clusterer 130 may be configured to extract entities from the user utterances and store in the database. The plurality of intents may be mapped to the plurality of actions corresponding to the user query. In an example embodiment, mapped plurality of intents and the plurality of actions corresponding to the user query may be stored in a machine readable dictionary format.

The system may further include a chatbot engine coupled to the processor. The chatbot engine may be trained to execute one or more actions of the plurality of actions to specific intents of the plurality of intents based on the user query. In an example embodiment, the chatbot engine may include a natural language understanding (NLU) module and a dialog manager 170.

In an example embodiment, execution of the machine readable program instructions by the processor can further cause the dialog manager 170 to create a plurality of training data that may include the set of stories and learn from the training data based on the NLU module coupled to the ML engine 160 to generate appropriate responses.

In another example embodiment, the NLU module may recognize the plurality of intents and the plurality of entities based on the training model. The NLU module may further return the plurality of intents and the plurality of entities in a structured machine-readable format. In an example embodiment, in RASA, incoming messages may be processed by a sequence of components. The sequence of components may be executed one after another in a processing pipeline defined in config.yml. Choosing an NLU pipeline may allow the user to customize and finetune the model on the dataset. The entities and intents may be mapped with the actions using Recurrent Neural Network handled by RASA core in the dialog manager 170.

In yet another example embodiment, the dialog manager 170 may be coupled to the memory, and a first set of datasets may be stored as slots in the memory. The first set of dataset may pertain to information to be tracked during a conversation of a dialog. Further the slots may be configured to influence flow of the dialog. In an example embodiment, the user may specify whether or not a slot influences the conversation with the influence_conversation property. If the user wants to store information in a slot without influencing the conversation, the influence_conversation may be set to false when defining the slot.

In an example embodiment, the dialog manager 170 may further keep track of conversation of the dialog with the user and receive a second set of datasets. The second set of dataset may pertain to a new message received corresponding to the dialog. The dialog manager may further maintain state of the dialog with the user, where the state of the dialog may be stored in the memory. Furthermore, the dialog manager may retrieve the state of the dialog upon receiving the second set of dataset and update the state of the dialog upon execution of the plurality of actions.

In an example embodiment, the system 100 may further receive a current state of the dialog. The system may further determine an action among the plurality of actions to be taken based on the current state of the dialog received. Furthermore, the system may store the action to be taken and based on the action stored, transmit a response to the user.

Figure 2:
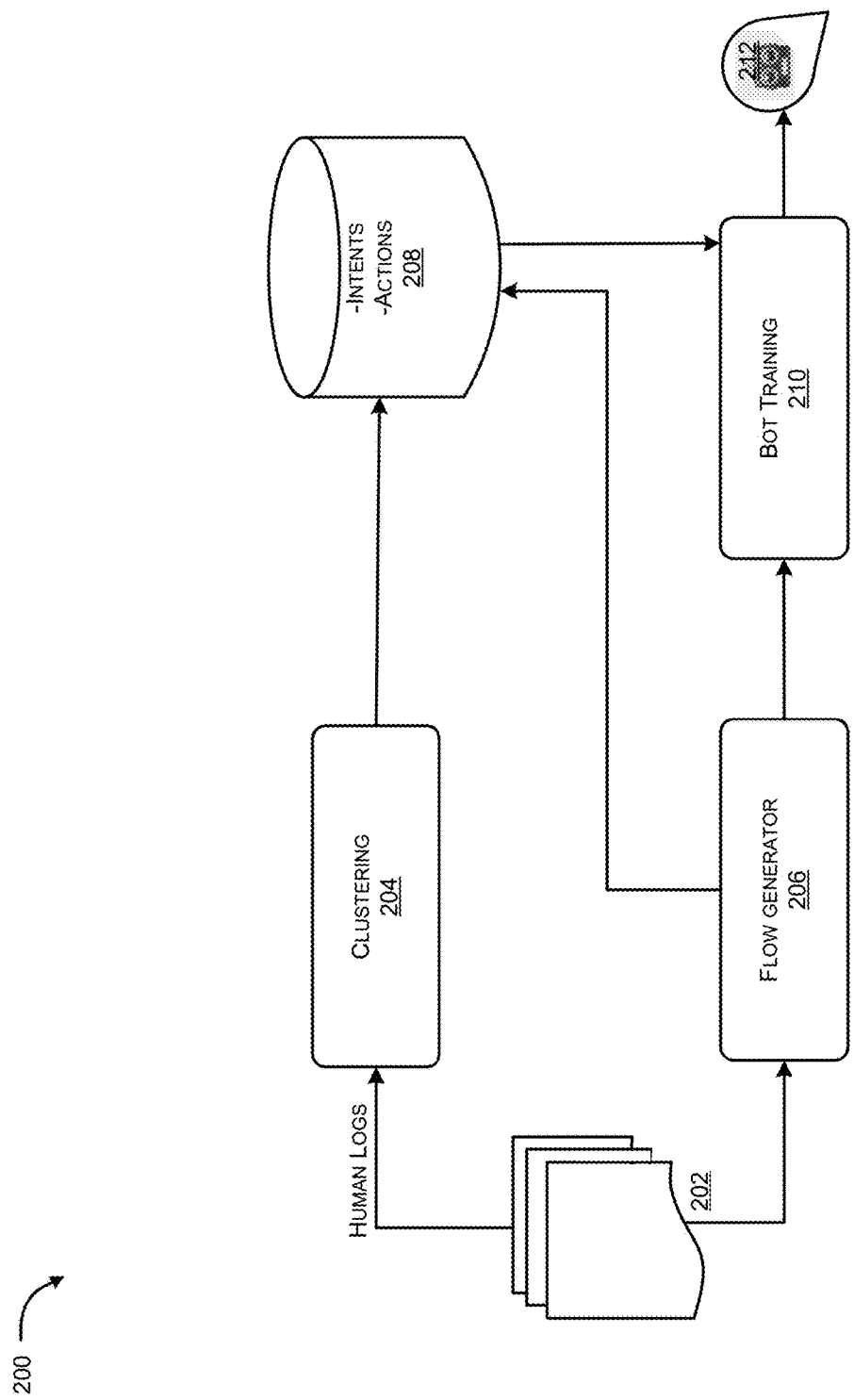
FIG. 2 illustrates a high level architecture of the system of FIG. 1. according to an example embodiment of the present disclosure.

FIG. 2 illustrates high level architecture of the system of FIG. 1, according to an example embodiment of the present disclosure. The system 100 may include steps for creation of a chatbot 212 from the human chat logs 202. The human chat logs 202 may include a plurality of user utterances and a plurality of agent utterances of a first and a second user respectively. The clusterer 130 may include the clustering block 204 that may cluster the user utterances as well as agent utterances. The user utterance may be clustered for mining of a plurality of intents by the data miner 140. Agent utterances may be clustered mining of a plurality of actions associated with the plurality of intents. The plurality of intents and the plurality of actions may be stored in block 208. The stored plurality of intents and the plurality of actions may be provided to the story generation block 206 (also referred to as flow generator block 206 and story generator 150) to generate a set of stories or flows that may be further provided as input to train the chatbot 212.

Figure 3:
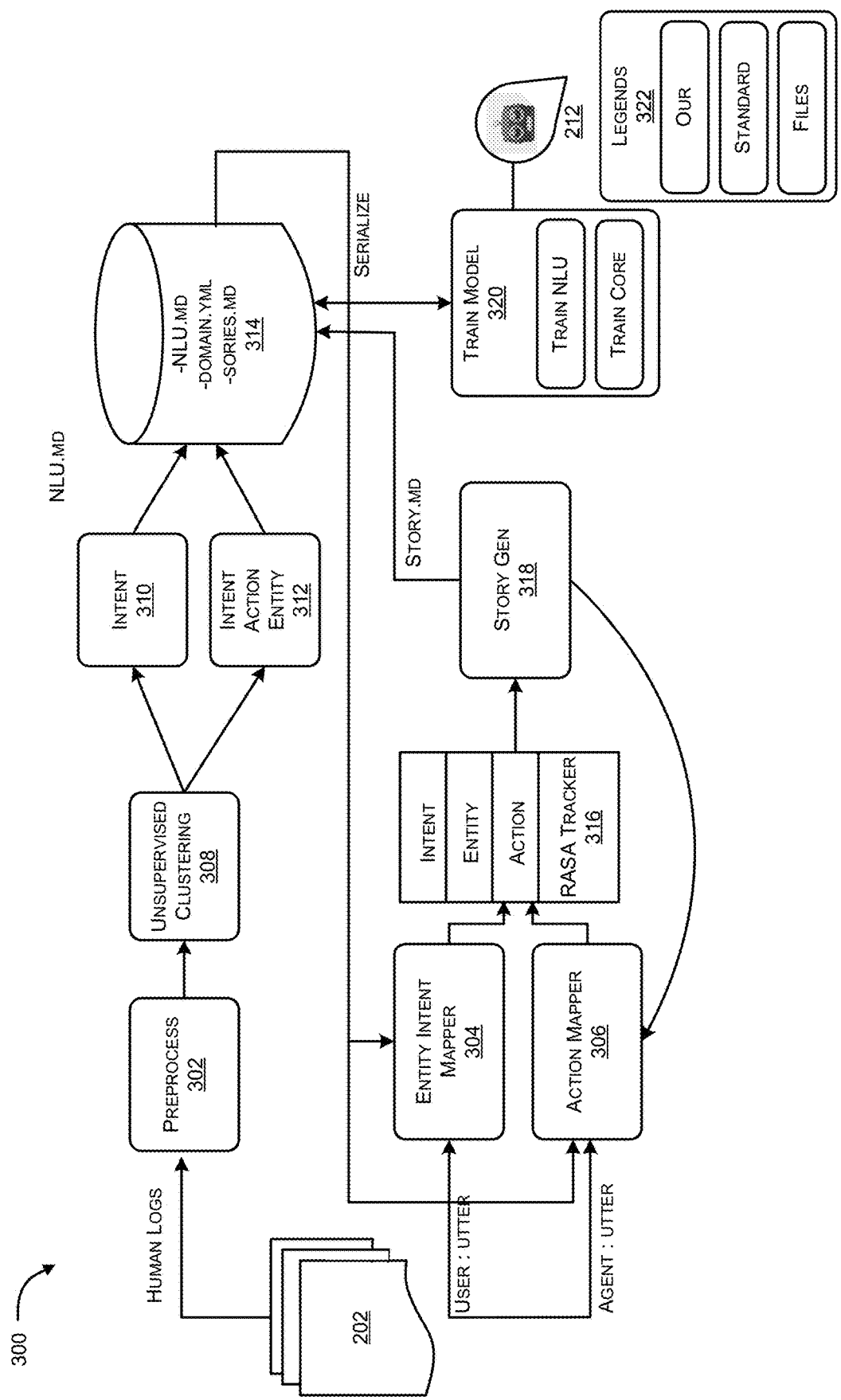
FIG. 3 illustrates components of the system of FIG. 2, according to an example embodiment of the present disclosure.

FIG. 3 illustrates components of the system of FIG. 2, according to an example embodiment of the present disclosure. The system 100 may process human chat logs 202. The human chat logs may include human-to-human chat transcripts. Each transcript may be a complete conversation between a first user and a second user. The human chat logs may be used as a training data. In an example embodiment, the training data may be preprocessed at block 302. The preprocessing may be needed to extract and duster user utterances and agent utterances at block 308 required for mining a plurality of intents and a plurality of actions respectively. The preprocessing may also include data cleaning such as punctuation removal, stop-word removal, lemmatization, missing values treatment and the like.

In an example embodiment, the plurality of entities may also be extracted from user utterances at block 308 through unsupervised clustering. The unsupervised clustering may be used to identify the number of intents (in customer utterances) or actions (in agent responses) in the data. By way of example and not as a limitation, all domain specific entities may be extracted from user utterances using spaCY and the extracted plurality of entities may be stored a domain file of the dialog manager 170. By way of example and not as a limitation, the spaCY may be used as SpacyEntityExtractor module in the RASA that may be specified in the RASA pipeline.

In another example embodiment, intent and entity mapper generation at block 304 may be coupled to the data miner 140. In a way of example, and not as a k-means clustering with bag of words approach may be implemented to determine total number of intents. Number of clusters obtained may correspond to total number of intents possible in a given set of human chat logs. The user utterances assigned to a duster corresponding to an intent of the plurality of intents may point to the particular intent. The mapped intent may be stored in a machine readable dictionary format. In a way of example and not as a limitation, the plurality of intents may be stored as a first set of keys. The user utterances belonging to respective plurality of intents may be stored as a first set of values in a dictionary. The dictionary may work as an intent mapper. The plurality of intents may be classified in a machine readable markdown script "nlu.md" that may include all the intents and the associated user utterances.

In another example embodiment, an action mapper generation at block 306 may be coupled to the data miner 140. The action mapper generation 306 may map the plurality of actions to the plurality of intents. The plurality of actions may be mined by the data miner 140. In a way of example, and not as a limitation, actions may correspond to steps that a chatbot may take when specific intents might be triggered by a user query. The agent utterances from human-to-human conversations may be collected and clustered to generate total number of agent utterances possible for a pre-defined domain. The agent utterances assigned to a cluster may point to a particular action. The mapped action may be stored in the machine readable dictionary format. In a way of example and not as a limitation, the plurality of actions may be stored as a second set of keys. The agent utterances belonging to respective plurality of actions may be stored as a second set of values in the dictionary. The dictionary may work as an action mapper. The plurality of actions may be classified in a machine readable domain file "YAML Ain't Markup Language" that may include all the actions associated with the agent utterances. By way of example, but not as a limitation, a first cluster may be considered as a first action and all the responses falling under the first cluster may be assigned to the first action as required by "domain.yml" database in a language markup format used in the RASA architecture.

The plurality of intents, entities and actions may be fed to the story generation block at 316 to generate a set of stories. In a way of example and not as a limitation, the set of stories may be created based on an input format determined by a Natural Language Understanding (NLU) module coupled to the ML engine 160. The NLU module may transform human language into a machine-readable format by using natural language processing techniques such as named entity recognition, sentiment analysis, text summarization, aspect mining and topic modeling. With the help of the NLU module and ML engine 160.

In another example embodiment the system 100 may automatically analyze data by focusing on ability of the system 100 to understand the human language. The NLU module may be further configured to rearrange unstructured data so that machines may understand and analyze the unstructured data. By way of example and not as a limitation, the NLU module may provide machine translation (MT), automated reasoning, automatic ticket routing and question answering. The NLU module may recognize intents and entities from human chat logs based on previous training data and may return the intents and entities in a machine readable structured format. In an example embodiment, in the RASA pipeline NLU may be used through spaCY. In an example embodiment, and not as limitation, the NLU module may combine at least one of annotators from spaCy parser to interpret input data such as NLP spaCy, Tokenizer spaCy, Intent Entity Featurizer Regex, Intent Featurizer spaCy, NER CRF, NER Synonyms, Intent Classifier Sklearn. The NLU module may interpret intents from the user utterances based on predefined intents. In a way of example, but not as a limitation, at least one example may be—Hi I need to ask you about ebill which I have not received. my email address is: [xxx@yyy.com]. ebill may correspond to an intent. Entity extraction may also take place in the NLU module by recognizing structured data xxx@yyy.com as an "email".

In an example embodiment, the dialog manager 170 may learn and self train from the set of stories generated. The dialog manager 170 may track state of conversation and store the tracked information as slots in a key-value format. In another example embodiment, the slots may be the memory of the chatbot. In yet another embodiment, a third set of values indicating the slots may influence the flow of dialog.

In an example embodiment, the dialog manager 170 may generate templates. The templates may be messages or responses that the chatbot may send back to the user. If the name of the template starts with an utterance, the utterance may directly be used like an action.

In a way of example and not as a limitation, to create a set of stories efficiently, the story generator 150 may be configured to train the dialog manager 170 to learn from the set of stories having a list of conversations. In another example, but not as a limitation, at least a story may start with a name preceded by at least two hashes, such as, for example, ##story03248462. The story may be called anything, but it may be very useful for debugging to give the story descriptive names. By way of an example and not as a limitation, end of the story may be denoted by a newline, and a new story may start again with ##.

In an example embodiment, but not a limitation, messages sent by a user may be shown as lines starting with * in the format intent"entity1": "value", "entity2": "value". An action executed by the chatbot may be shown as lines starting with—and may contain the name of the action. Events returned by the action may be on lines immediately after that action. In a way of example and not as a limitation, if an action returns a SlotSet event, line—slot"slot name": "value" may be shown. The set of stories may include various scenarios as per the kind of conversations expected between the user and the chatbot.

Figure 4A:
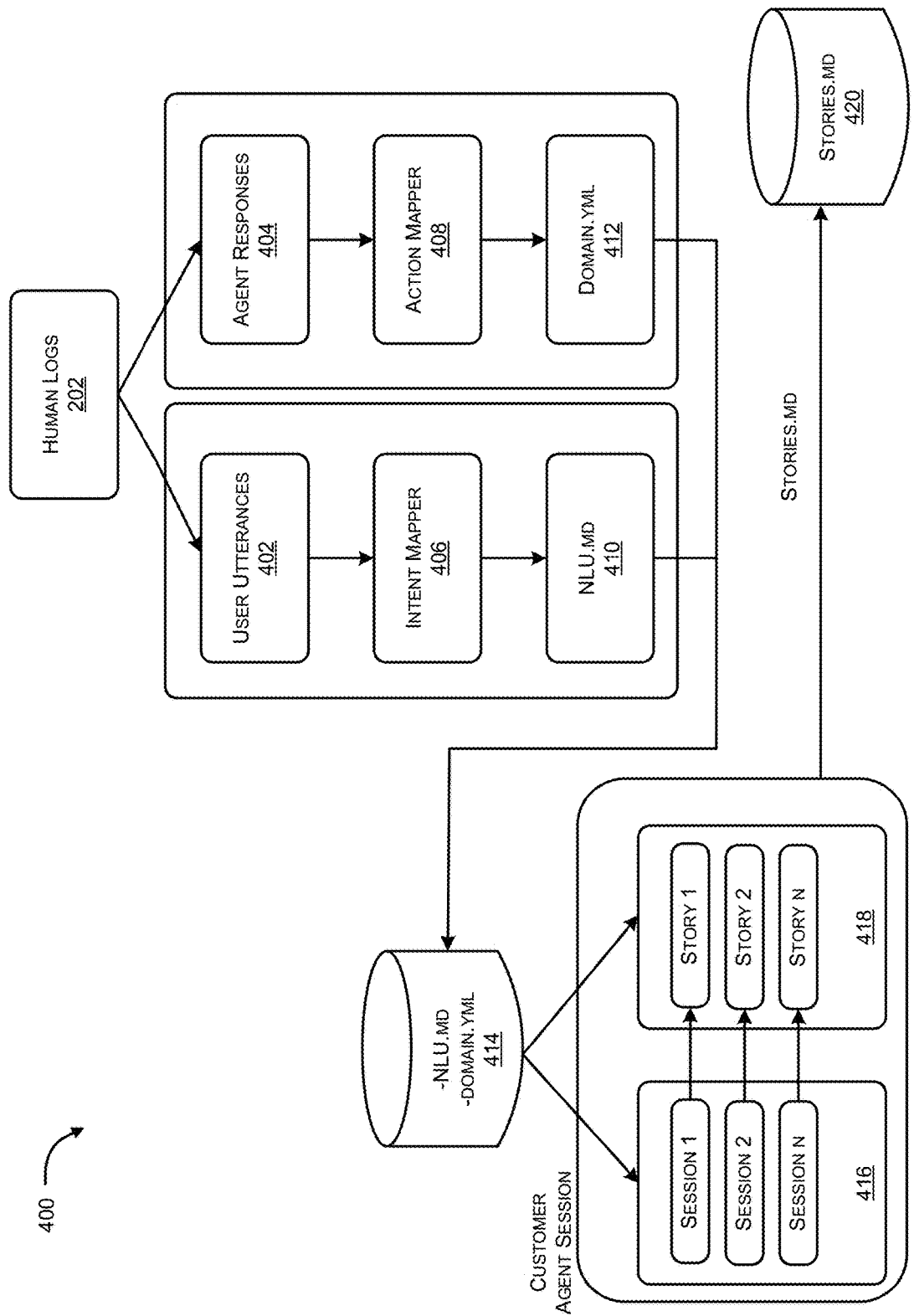
FIG. 4A illustrates a flow diagram showing data creation flow with the system of FIG. 1, according to an example embodiment of the present disclosure.
Figure 4B:
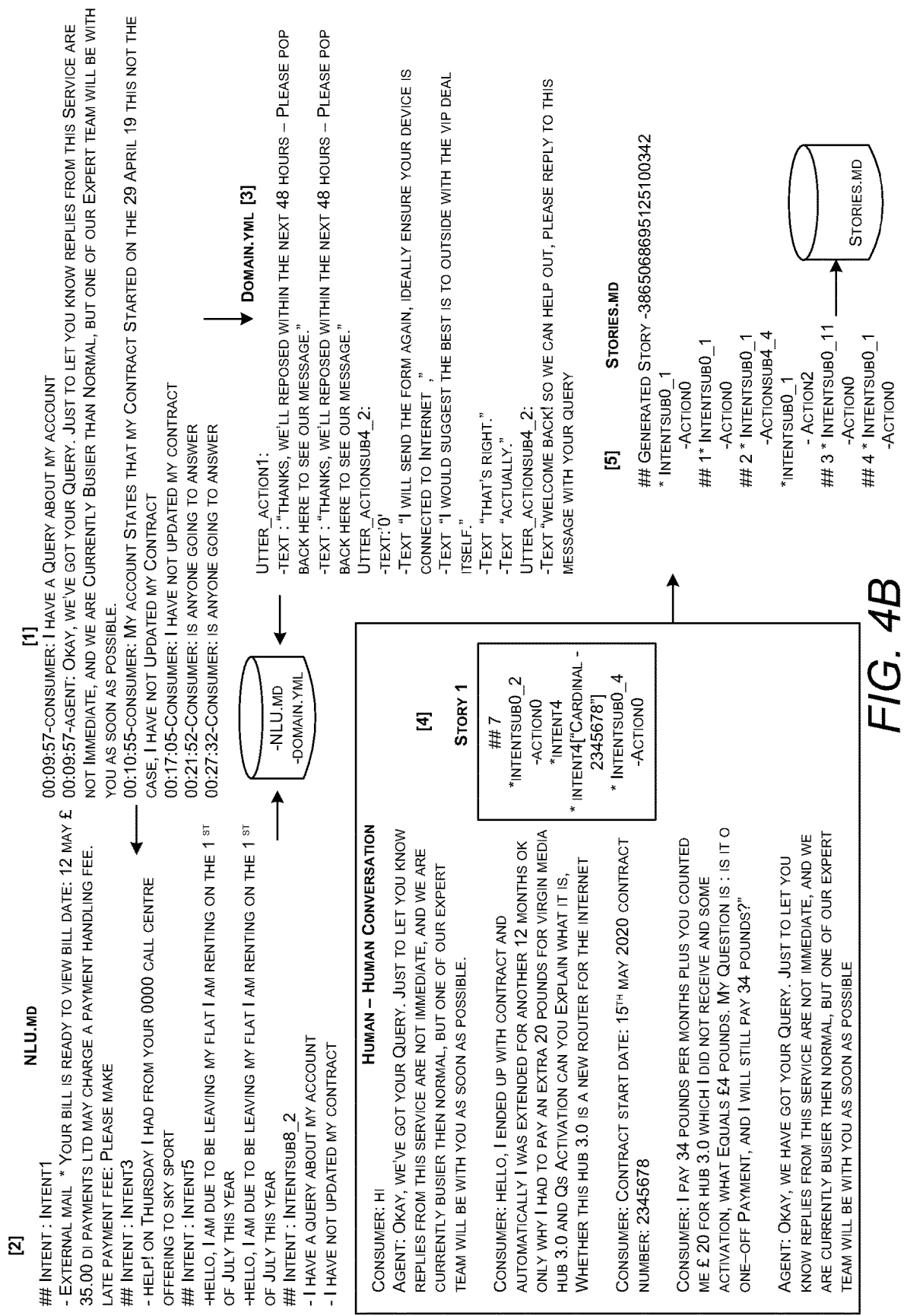
FIG. 4B illustrates an example of the flow diagram in FIG. 4A, according to an example embodiment of the present disclosure.

FIG. 4A illustrates a flow diagram showing data creation flow with the system of FIG. 1, according to an example embodiment of the present disclosure. As illustrated the flow diagram shows a set of human chat logs at block 202 and how the human chat logs are processed to auto generate a chatbot. FIG. 4B illustrates an example of the flow diagram in FIG. 4A, according to an example embodiment of the present disclosure. The flow diagram of FIG. 4A may include the step 402 of clustering user utterances from the human chat logs and the step 404 of clustering agent utterances. The flow diagram may further include the step 406 of mapping intents to clustered user utterances through intent and entities mapping module and the step of 410 of storing the mapped intents as NLU.md in a database.

In an example embodiment, the flow diagram may further include the step 408 of mapping actions to clustered user utterances through an action mapping module and the step of 412 of storing the mapped intents in domain.yml in the database. The flow diagram may include the step 414 of extracting the mapped intents and mapped actions from the nlu.md and domain.yml to create a plurality of sessions to generate a plurality of stories at step 416 in one example embodiment. The plurality of stories generated may be stored as stories.md in the database at step 420.

In an example embodiment, the intents and entities mapping module may be configured to read each conversation in the human chat logs line by line. Whenever any user utterance occurs, the intents and entities mapping module may map the user utterance with corresponding intent from nlu.md. In another example embodiment, the actions mapping module may be configured to read each conversation in the human chat logs line by line and whenever any agent utterance occurs, the action mapping module may map the agent utterance with corresponding action from domain.yml.

In yet another example embodiment, the intent and action mining may be processed through a data mining model provided by the data miner 140. The data mining model may include the steps:

Total data points are N out of that L are labelled and L-N are unlabeled $(x1,y1),(x2,y2) \ldots (xL,yL)$ are the labelled data and $(xL+1,yL+1),(xL+2,yL+2) \ldots (xN,yN)$ are unlabeled data where $yl \varepsilon \{1 \ldots C\}$ Feature vector for sentences Problem is to estimate I-N from I data points Create a fully connected graph such that each and every edge represent weights between the sentences Weights are based on Euclidian distances Create N×N transition matrix In another example embodiment, a set of instructions performing the intent and action mining be mapped to each other and clustered with a particular label. The labeling may be performed through a label propagation algorithm. The label propagation algorithm may include the steps:

All nodes propagate labels for one step: $Y \leftarrow T\, Y$

Row-normalize Y to maintain the class probability interpretation.

Clamp the labeled data.

Repeat from step 2 until Y converges

In an example embodiment, the plurality of stories generated may be required to train a dialog manager 170. The dialog manager 170 may acquire a conversation between a user and a chatbot. In an example embodiment, a user query may be received and passed to an NLU module. The NLU module may convert the user query into a machine readable dictionary format. The machine readable dictionary format may include original text, intent, and entities that were identified.

In an example embodiment the NLU module may be configured to parse the user query as the dialog manager may not be able to interpret the user query from the user itself.

In another example embodiment, a set of instructions (also referred to as tracker hereinafter) may be executed to keep track of conversation of the dialog with the user and may receive a second set of dataset. The second set of dataset may pertain to a new message received corresponding to the dialog. The tracker may also be executed to maintain state of the dialog with the user. The state of the dialog may be stored in the memory. The tracker may retrieve the state of the dialog upon receiving the second set of dataset and update the state of the dialog upon execution of the plurality of actions.

In an example embodiment, the tracker may include at least one of RASA tracker and any dialog state tracker but not limited to the like.

In yet another example embodiment, the system may further receive a current state of the dialog. The system may determine an action among the plurality of actions to be taken based on the current state of the dialog received. Further, the system may store the action to be taken and based on the action stored, transmit a response to the user.

In an example embodiment, the chatbot may interact with third party applications.

FIG. 4C to 4H illustrate implementation outputs during chatbot creation using the proposed system, according to example embodiments of the present disclosure. As illustrated, FIG. 4C depicts an example intent stored in nlu.md database. The example intent shows how a set of intents may be stored in the nlu.md database. The nlu.md may be further used in training the chatbot. As depicted, messages sent by a user may be shown as lines starting with * in the format intent"entity1": "value", "entity2": "value". FIG. 4D depicts an example action stored in domain.yml database. The example action may depict how a set of actions may be generated for the set of intents in FIG. 4C stored in the nlu.md. The mapping may be performed to aid in predicting the training model by the ML engine. The action executed by the chatbot may be shown as lines starting with—and may contain the name of the action. FIG. 4E illustrates an example of story generation and stored story in stories.md respectively. The stories may be generated from the mapping of the intents stored in the nlu.md and the actions stored in the domain.yml. The stories may further be the basis of auto generating the chatbot. In a way of example and not as a limitation, if an action returns a SlotSet event, line—slot- "slot name"; "value" may be shown. The set of stories may include various scenarios as per the kind of conversations expected between the user and the bot. FIG. 4F depicts an example of tracking state of conversation by a RASA tracker but not limited to it. The state of conversation may be tracked in order to keep track of the flow of dialog whenever a conversation is left in between or a new message is provided. FIG. 4G illustrates an instance of the stories.md machine readable format and highlights how each action is mapped to intents in the machine readable format. FIG. 4H illustrates another instance of the stories.md machine readable format and highlights how each action is mapped to intents in the machine readable format.

Figure 5:
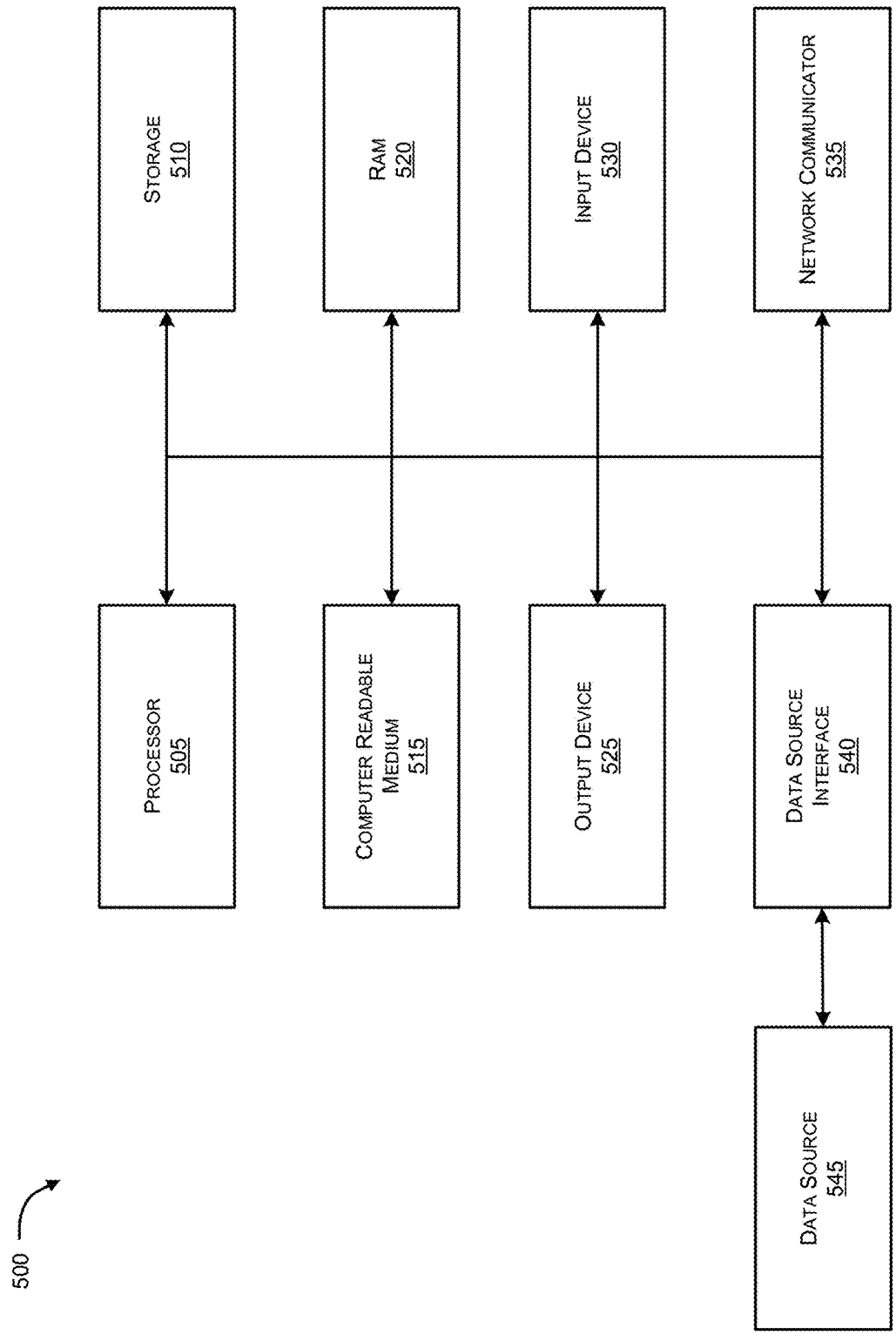
FIG. 5 illustrates a hardware platform for implementation of the system, according to an example embodiment of the present disclosure.

FIG. 5 illustrates a hardware platform for implementation of the system, according to an example embodiment of the present disclosure. For the sake of brevity, construction and operational features of the system 100 which are explained in detail above are not explained in detail herein. Particularly, computing machines such as but not limited to internal/external server dusters, quantum computers, desktops, laptops, smartphones, tablets, and wearables which may be used to execute the system 100 or may have the structure of the hardware platform 500. As illustrated, the hardware platform 500 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 500 may be a computer system such as the system 100 that may be used with the embodiments described herein. The computer system may represent a computational platform that includes components that may be in a server or another computer system. The computer system may execute, by the processor 505 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 505 that executes software instructions or code stored on a non-transitory computer-readable storage medium 510 to perform methods of the present disclosure. The software code includes, for example, instructions to gather human chat logs and mine and extract intents, entities and actions from the human chat logs. In an example, the clusterer 130, the data miner 140, and the story generator 150, the ML engine 160 and the dialog manager 170 may be software codes or components performing these steps.

The instructions on the computer-readable storage medium 510 are read and stored the instructions in storage 515 or in random access memory (RAM). The storage 515 may provide a space for keeping static data where at least some instructions could be stored for later execution. The stored instructions may be further compiled to generate other representations of the instructions and dynamically stored in the RAM such as RAM 520. The processor 505 may read instructions from the RAM 1320 and perform actions as instructed.

The computer system may further include the output device 525 to provide at least some of the results of the execution as output including, but not limited to, visual information to users, such as external agents. The output device 525 may include a display on computing devices and virtual reality glasses. For example, the display may be a mobile phone screen or a laptop screen. GUIs and/or text may be presented as an output on the display screen. The computer system may further include an input device 530 to provide a user or another device with mechanisms for entering data and/or otherwise interact with the computer system. The input device 530 may include, for example, a keyboard, a keypad, a mouse, or a touchscreen. Each of these output device 525 and input device 530 may be joined by one or more additional peripherals. For example, the output device 525 may be used to display the results of the clusterer 130, the data miner 140, and the story generator 150, the ML engine 160 and the dialog management engine 170.

A network communicator 535 may be provided to connect the computer system to a network and in turn to other devices connected to the network including other clients, servers, data stores, and interfaces, for instance. A network communicator 535 may include, for example, a network adapter such as a LAN adapter or a wireless adapter. The computer system may include a data sources interface 540 to access the data source 545. The data source 545 may be an information resource. As an example, a database of exceptions and rules may be provided as the data source 545. Moreover, knowledge repositories and curated data may be other examples of the data source 545.

Figure 6:
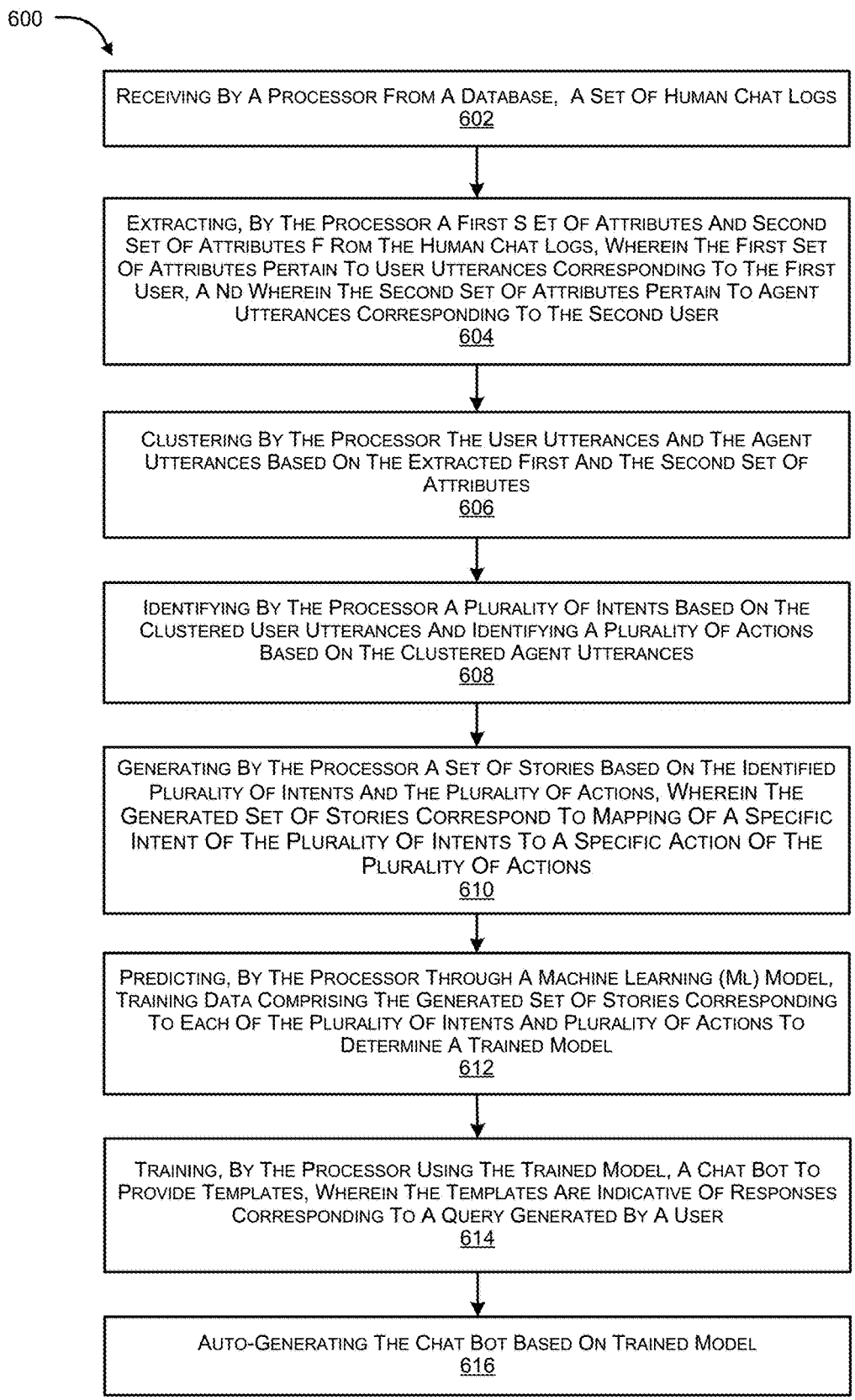
FIG. 6 illustrates a process flowchart for generating an executable chatbot, according to an example embodiment of the present disclosure.

FIG. 6 illustrates a process flowchart 600 for generating an executable chatbot, according to an example embodiment of the present disclosure.

Another example embodiment of the present disclosure pertains to a method for generating a chatbot. The method can include the step 602 of receiving from a database by a clusterer, a set of human chat logs. The human chat logs may include a dialog of human-to-human conversations in a machine readable format between a first user and a second user.

An example method may further include the step 604 for extracting by the clusterer a first and second set of attributes from the human chat logs. The first set of attributes may pertain to user utterances, and the second set of attributes may pertain to agent utterances. The method may further include the step 606 of clustering by the clusterer to cluster the user utterances and the agent utterances based on the extracted first and the second set of attributes.

An example method of the present disclosure may include the step 608 of configuring a data miner to identify a plurality of intents based on the clustered user utterances and identify a plurality of actions based on the clustered agent utterances.

Another example method may include the step 610 of generating by a story generator to generate a set of stories based on the identified plurality of intents and the plurality of actions. The generated set of stories may correspond to mapping of a specific intent of the plurality of intents to a specific action of the plurality of actions.

An example method may further include the step 612 of predicting by an ML engine, training data that may include the generated set of stories corresponding to each of the plurality of intents and plurality of actions to determine a trained model. The method may also include the step 614 of training using the trained model, a chatbot to generate templates. The templates may be indicative of responses corresponding to a query generated by a user. The method may further include the step 616 of autogenerating the chatbot based on the trained model.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system for generating an executable chatbot, the system comprising:
 a processor comprising:
 a clusterer to:
  receive from a database, a set of human chat logs, wherein the set of human chat logs comprises a dialog of human-to-human conversations between a first user and a second user;
  extract a first set of attributes and a second set of attributes from the human chat logs, wherein the first set of attributes pertain to user utterances corresponding to the first user, and wherein the second set of attributes pertain to agent utterances corresponding to the second user, wherein the first set of attributes corresponds to at least one of keywords, intents, and actions associated with the user utterances, and the second set of attributes corresponds to at least one of keywords, intents, actions, and responses associated with the agent utterances;
  cluster the user utterances and the agent utterances based on the extracted first and the second set of attributes;
 a data miner to:
  identify a plurality of intents based on the clustered user utterances, wherein the plurality of intents are identified based on mapping the clustered user utterances to pre-stored intents in the database; and
  identify a plurality of actions based on the clustered agent utterances, wherein the plurality of actions are identified based on mapping the clustered agent utterances to pre-stored actions in the database;
 a story generator to:
  generate a set of stories based on the identified plurality of intents and the plurality of actions, wherein the generated set of stories correspond to mapping of a specific intent of the plurality of intents to a specific action of the plurality of actions, and the set of stories comprise a plurality of scenarios based on type of conversations expected between a user and a chatbot, wherein the set of stories are created based on an input format determined by a Natural Language Understanding (NLU) module and each of the stories start with a name preceded by at least two hashes, and end of the stories is denoted by a newline;
 a machine learning (ML) engine to:
  predict training data comprising the generated set of stories corresponding to each of the plurality of intents and plurality of actions to determine a trained model, wherein the trained model is determined as an optimal model from among a plurality of machine learning models;
  train, using the trained model, a chatbot to generate templates, wherein the templates are indicative of responses corresponding to a query generated by a user; and
  auto generate the chatbot based on the trained model, wherein the trained mode comprises at least one of a support vector machine (SVM) model, and a long short-term memory (LSTM) model and components of the trained model comprise at least one of a tokenizer, a featurizer, an entity extractor, and a classifier.

2. The system as claimed in claim 1, wherein the clusterer is to extract a plurality of entities from the user utterances, wherein the plurality of entities are stored in the database.

3. The system as claimed in claim 1, wherein the plurality of intents are mapped to the plurality of actions corresponding to the user query, the mapped plurality of intents and the plurality of actions corresponding to the user query being stored in a dictionary format.

4. The system as claimed in claim 1, wherein the system further comprises a chatbot engine coupled to the processor, the chatbot engine to:
   execute one or more actions of the plurality of actions to specific intents of the plurality of intents based on the user query.

5. The system as claimed in claim 4, wherein the chatbot engine comprises the natural language understanding (NLU) module and a dialog manager.

6. The system as claimed in claim 1, further including a dialog manager coupled to-the processor, the dialog manager to:
   create a plurality of training data comprising a set of stories; and
   learn from the training data based on the NLU module coupled to the ML engine.

7. The system as claimed in claim 6, wherein the NLU module recognizes the plurality of intents and the plurality of entities based on the training model and returns the plurality of intents and the plurality of entities in a structured format.

8. The system as claimed in claim 1, wherein the dialog manager is coupled to the memory to store a first set of dataset as slots, the first set of datasets pertaining to an information to be tracked during a conversation of a dialog to influence flow of the dialog.

9. The system as claimed in claim 1, wherein a set of instructions are executed by the processor to cause the dialog manager to:
   keep track of conversation of the dialog with the user;
   receive a second set of dataset, the second set of dataset pertaining to a new message received corresponding to the dialog;
   maintain a state of the dialog with the user, wherein the state of the dialog is stored in the memory;
   retrieve the state of the dialog upon receiving the second set of datasets; and
   update the state of the dialog upon execution of the plurality of actions.

10. The system as claimed in claim 1, wherein the system is further to:
    receive a current state of the dialog;
    determine an action among the plurality of actions to be taken based on the current state of the dialog received;
    store the action to be taken; and
    based on the action stored, transmit a response to the user.

11. A method for generating a chatbot, the method comprising:
    receiving, by a processor, from a database, a set of human chat logs, wherein the set of human chat logs comprises a dialog of human-to-human conversations between a first user and a second user;
    extracting, by the processor a first set of attributes and second set of attributes from the human chat logs, wherein the first set of attributes pertain to user utterances corresponding to the first user, and wherein the second set of attributes pertain to agent utterances corresponding to the second user, wherein the first set of attributes corresponds to at least one of keywords, intents, and actions associated with the user utterances, and the second set of attributes corresponds to at least one of keywords, intents, actions, and responses associated with the agent utterances;
    clustering, by the processor, the user utterances and the agent utterances based on the extracted first and the second set of attributes;
    identifying, by the processor a plurality of intents based on the clustered user utterances, wherein the plurality of intents are identified based on mapping the clustered user utterances to pre-stored intents in the database;
    identifying, by the processor a plurality of actions based on the clustered agent utterances, wherein the plurality of actions are identified based on mapping the clustered agent utterances to pre-stored actions in the database;
    generating, by the processor, a set of stories based on the identified plurality of intents and the plurality of actions, wherein the generated set of stories correspond to mapping of a specific intent of the plurality of intents to a specific action of the plurality of actions, and the set of stories comprise a plurality of scenarios based on type of conversations expected between a user and a chatbot, wherein the set of stories are created based on an input format determined by a Natural Language Understanding (NLU) module and each of the stories start with a name preceded by at least two hashes, and end of the stories is denoted by a newline;
    predicting, by the processor, training data comprising the generated set of stories corresponding to each of the plurality of intents and plurality of actions to determine a trained model, wherein the trained model is determined as an optimal model from among a plurality of machine learning models;
    training, by the processor, using the trained model, a chatbot to generate templates, wherein the templates are indicative of responses corresponding to a query generated by a user; and
    auto generating, by the processor, the chatbot based on the trained model, wherein the trained model comprises at least one of a support vector machine (SVM) model, and a long short-term memory (LSTM) model and components of the trained model comprise at least one of a tokenizer, a featurizer, an entity extractor, and a classifier.

12. The method as claimed in claim 11, further comprising:
    mapping the plurality of intents to the plurality of actions corresponding to the user query, the mapped plurality of intents and the plurality of actions corresponding to the user query being stored in a dictionary format.

13. The method as claimed in claim 11, further comprising:
    recognizing by the NLU module, the plurality of intents and the plurality of entities based on the training model; and
    returning the plurality of intents and the plurality of entities in a structured format.

14. The method as claimed in claim 11, further comprising:
    storing a first set of datasets as slots in the memory, the first set of datasets pertain to information to be tracked during a conversation of a dialog and wherein the slots influence flow of the dialog.

15. The method as claimed in claim 14, further comprising:
    keeping track of conversation of the dialog with the user;
    receiving a second set of datasets, the second set of datasets pertaining to a new message received corresponding to the dialog;

maintaining a state of the dialog with the user, wherein the state of the dialog is stored in the memory;

retrieving the state of the dialog upon receiving the second set of datasets; and updating the state of the dialog upon execution of the plurality of actions.

16. The method as claimed in claim 15, further comprising:

receiving a current state of the dialog;

determining an action among the plurality of actions to be taken based on the current state of the dialog received;

storing the action to be taken; and based on the action stored, transmitting the response to the user.

17. A non-transitory computer readable medium comprising machine executable instructions that are executable by a processor to:

receive from a database, a set of human chat logs, wherein the set of human chat logs comprises a dialog of human-to-human conversations between a first user and a second user;

extract a first set of attributes and second set of attributes from the human chat logs, wherein the first set of attributes pertain to user utterances corresponding to the first user, and wherein the second set of attributes pertain to agent utterances corresponding to the second user, wherein the first set of attributes corresponds to at least one of keywords, intents, and actions associated with the user utterances, and the second set of attributes corresponds to at least one of keywords, intents, actions, and responses associated with the agent utterances;

cluster the user utterances and the agent utterances based on the extracted first and the second set of attributes;

identify a plurality of intents based on the clustered user utterances, wherein the plurality of intents are identified based on mapping the clustered user utterances to pre-stored intents in the database;

identify a plurality of actions based on the clustered agent utterances, wherein the plurality of actions are identified based on mapping the clustered agent utterances to pre-stored actions in the database;

generate a set of stories based on the identified plurality of intents and the plurality of actions, wherein the generated set of stories correspond to mapping of a specific intent of the plurality of intents to a specific action of the plurality of actions, and the set of stories comprise a plurality of scenarios based on type of conversations expected between a user and a chatbot, wherein the set of stories are created based on an input format determined by a Natural Language Understanding (NLU) module and each of the stories start with a name preceded by at least two hashes, and end of the stories is denoted by a newline;

predict, training data comprising the generated set of stories corresponding to each of the plurality of intents and plurality of actions to determine a trained model, wherein the trained model is determined as an optimal model from among a plurality of machine learning models;

train, using the trained model, a chatbot to generate templates, wherein the templates are indicative of responses corresponding to a query generated by a user; and auto generate the chatbot based on the trained model, wherein the trained model comprises at least one of a support vector machine (SVM) model, and a long short-term memory (LSTM) model and components of the trained model comprise at least one of a tokenizer, a featurizer, an entity extractor, and a classifier.

18. The non-transitory computer readable medium as claimed in claim 17, further comprises a dialog manager is to:

create a plurality of training data comprising the set of stories; and learn from the training data based on the NLU module coupled to the ML engine.

19. The non-transitory computer readable medium as claimed in claim 17, wherein a set of instructions are executed by the processor to enable the dialog manager to:

keep track of conversation of the dialog with the user;

receive a second set of datasets, the second set of datasets pertaining to a new message received corresponding to the dialog;

maintain state of the dialog with the user, the state of the dialog is stored in the memory;

retrieve the state of the dialog upon receiving the second set of datasets; and update the state of the dialog upon execution of the plurality of actions.

20. The non-transitory computer readable medium as claimed in claim 19, wherein the non-transitory computer readable medium is further to:

receive a current state of the dialog;

determine an action among the plurality of actions to be taken based on the current state of the dialog received;

store the action to be taken; and based on the action stored, transmit a response to the user.

* * * * *

UNITED STATES PATENT AND TRADEMARK OFFICE
CERTIFICATE OF CORRECTION

| | |
|---|---|
| PATENT NO. | : 12,026,471 B2 |
| APPLICATION NO. | : 17/232991 |
| DATED | : July 2, 2024 |
| INVENTOR(S) | : Anurag D. Tripathi et al. |

Page 1 of 1

It is certified that error appears in the above-identified patent and that said Letters Patent is hereby corrected as shown below:

In the Claims

In Column 14, Line 59, in Claim 1, "mode" should read "model".

Signed and Sealed this
Fourteenth Day of January, 2025

Derrick Brent
*Acting Director of the United States Patent and Trademark Office*